J. Balla,
Band Saw Mill.
Nº 20,135.            Patented May 4, 1858.
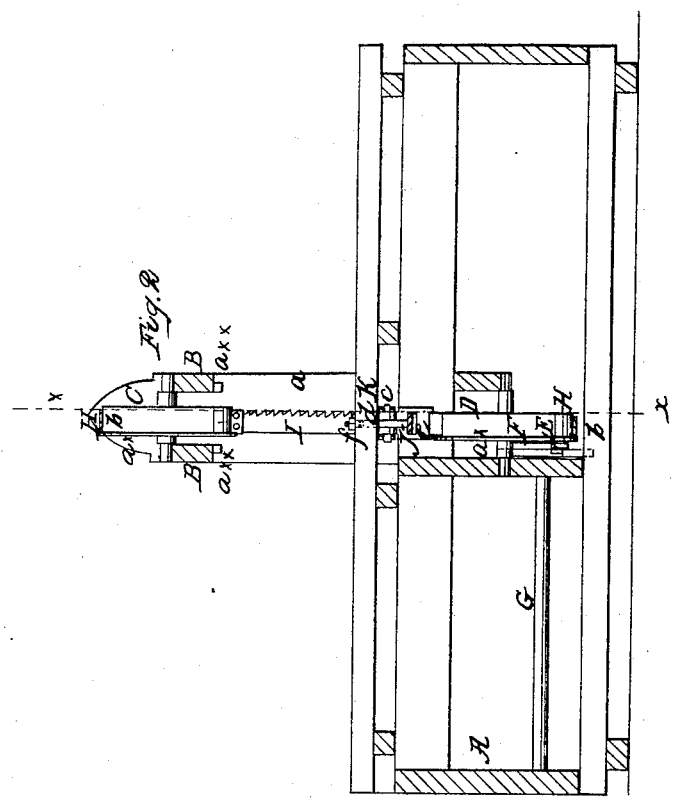
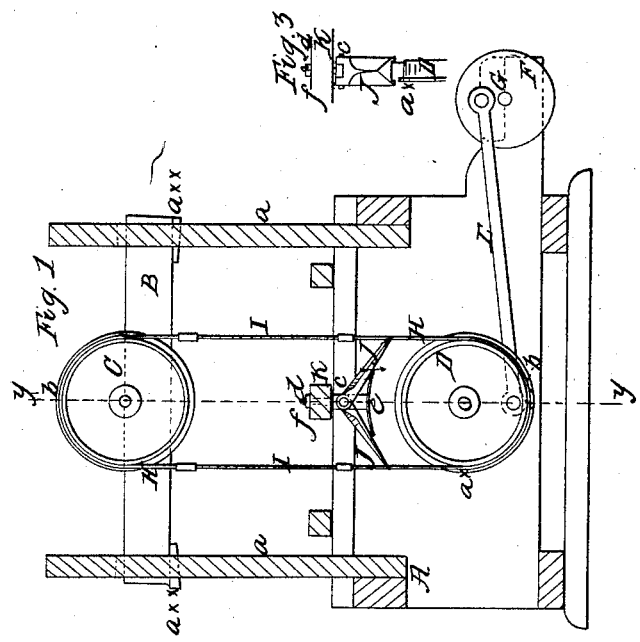

UNITED STATES PATENT OFFICE.

JAMES BALLA, OF RICHMOND, INDIANA.

DEVICE FOR SHELTERING FROM DUST THE LOWER CARRYING-PULLEY OF BAND-SAWS.

Specification of Letters Patent No. 20,135, dated May 4, 1858.

*To all whom it may concern:*

Be it known that I, JAMES BALLA, of Richmond, in the county of Wayne, and State of Indiana, have invented a new and useful Improvement in Reciprocating Sawing-Machines; and I do hereby declare that the following is a full, clear, and exact description of the same, reference being had to the annexed drawings, making a part of this specification, in which—

Figure 1, is a transverse vertical section of a sawing machine with my improvement applied to it. $x$, $x$, Fig. 2, indicates the plan of section. Fig. 2, is a longitudinal vertical section of ditto, taken in the line $y$, $y$, Fig. 1. Fig. 3, is a detached side view of the shields or guards.

Similar letters of reference indicate corresponding parts in the two figures.

This invention relates to an improvement in that class of sawing machines in which the saws are attached to straps or bands which pass over pulleys, having a reciprocating rotating motion.

The object of the invention is to obviate the difficulty attending the accumulation of saw dust between the lower pulley and saw board. This object is attained by having shields or guards placed over the lower pulley and arranged as hereinafter fully shown and described.

To enable those skilled in the art to fully understand and construct my invention I will proceed to describe it.

A represents a rectangular framing which may be constructed in any proper manner to support the working parts, to the framing A, two uprights $a$, $a$, are attached one at each side at opposite points, and B, B, are bars, the ends of which are fitted in mortises in the upper parts of the uprights, said bars being parallel with each other and having a pulley C, fitted between them, the axis of the pulley having its bearings on said bars.

D, is a pulley which is placed in the framing A, and in the same plane with pulley C. To this pulley near its periphery one end of a connecting rod E is attached, the opposite end of said rod being attached to a crank pulley F, on one end of a driving shaft G.

H, H, are metal straps which are placed in the pulleys C, D, and are attached to them at the points $b$, $b$, which are at their centers to prevent slipping.

I, I, are two saws which are attached to the ends of the straps H, H, the saws being parallel with each other, at opposite sides of the pulleys.

J, J, are two shields or guards which may be constructed of wood. These shields or guards are rather wider than the straps H, H, and their upper ends are hinged or jointed together below a longitudinal bar K, as shown at $c$, and a screw bolt $d$, passes through the joint of the shield or guards the lower end of said bolt having a curved bar $e$, attached to it. The upper end of bolt $d$, has a nut $f$, upon it. The upper edges of the shields or guards J, may be beveled both ways, from their centers outward and downward as shown clearly in Fig. 3, and by adjusting the nut $f$, the bar $e$, may be made to distend and press the ends of the shields against the straps.

The saws I, I, when the shaft G, is rotated, have a reciprocating motion given them through the medium of the crank pulley F, and rod E, the saws working simultaneously in opposite direction.

The stuff to be sawed may be fed to the saws in the usual way, and as the saw dust falls it cannot pass between the straps H and the lower pulley for the shields or guards J, J, receive the dust and cause it to fall off, at either side of the pulley D. By these shields or guards, therefore the saw dust is discharged free from the lower pulley and the difficulties hitherto attending the working of saws when hung in this manner are obviated, viz, the bending outward of the lower strap H, and the consequent deflection of the saws, which causes them to cut out of a vertical plane, thereby producing great friction and causing the saws to heat.

I would remark that the pulleys C, D, are each provided with a flanch $a^x$ to serve as proper bearings for the straps H, and I would further remark that the shields or guides may be constructed of wood or metal and also that the bars B, B, may have keys $a^{xx}$, placed under their ends in order to raise them and strain the saws when required.

I do not claim hanging saws by attaching the same to straps which pass over reciprocating rotating pulleys for this has been previously done, but—

Having thus described my invention what I claim as new and desire to secure by Letters Patent, is,

The shields or guards J, J, placed over the lower pulley D, when constructed and arranged relatively with the straps H, of said pulley, substantially as and for the purpose set forth.

JAMES BALLA.

Witnesses:
A. M. NORDYKE,
JOHN FINLEY.